United States Patent Office 3,630,911
Patented Dec. 28, 1971

3,630,911
LEAD FERRITE GLASS-CERAMIC ARTICLES AND
METHOD OF MAKING THE ARTICLES
Peter Charles Schultz, Painted Post, N.Y., assignor to
Corning Glass Works, Corning, N.Y.
Filed June 20, 1969, Ser. No. 835,206
Int. Cl. C03c 3/10, 3/22
U.S. Cl. 252—62.59   9 Claims

ABSTRACT OF THE DISCLOSURE

This invention relates to the manufacture of glass-ceramic articles containing lead ferrites as the principal crystal phase. More particularly, this invention relates to glass-ceramic articles with compositions in the PbO—$Fe_2O_3$—$SiO_2$ field which exhibit high magnetic susceptibility, such as to recommend their use as permanent magnets, and low electrical resistivity such as to suggest their utility as semiconductor materials.

Figure 1:
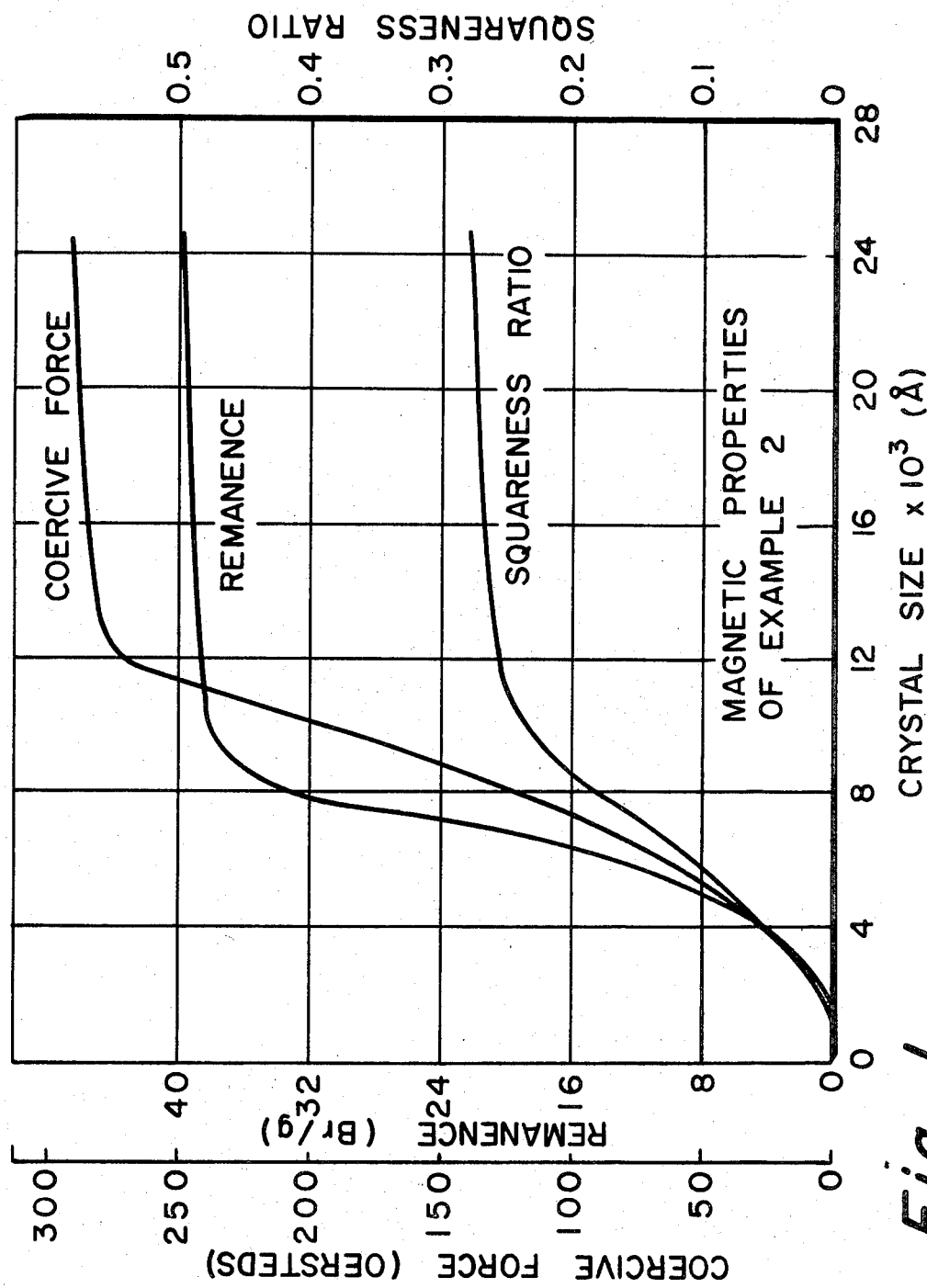

A glass-ceramic article is produced through the crystallization in situ of a glass article through the controlled heat treatment thereof. Thus, the manufacture of glass-ceramic articles comprises three principal steps: first, a glass-forming batch commonly including a nucleating agent is compounded; second, this batch is melted and the melt simultaneously cooled to a glass and an article of a desired configuration shaped therefrom; and, third, the glass shape is heat treated in accordance with a defined time-temperature schedule such that nuclei are initially developed in the glass which furnishes sites for the subsequent growth of crystals thereon as the heat treatment progresses.

Inasmuch as this crystallization in situ is accomplished through the essentially concurrent growth thereof on innumerable nuclei, the structure of a glass-ceramic article consists substantially of relatively uniformly-sized, fine-grained crystals homogeneously dispersed within a glassy matrix, the crystals constituting the predominant proportion of the article and the glassy matrix comprising the uncrystallized portion of the parent glass article. Therefore, glass-ceramic articles are free from voids and are non-porous. The crystallinity commonly results in rendering the chemical and physical properties of glass-ceramic articles materially different from those of the parent glass and imparts characteristics thereto more closely approximating those demonstrated by the crystals. Finally, the composition of the residual glassy matrix will be substantially different from that of the original glass since the crystal components will have been crystallized therefrom.

The crystal phases developed in glass-ceramic articles depend upon the composition of the parent glass and the heat treatment applied thereto. U.S. Pat. No. 2,920,971, the basic patent in the field of glass-ceramics provides an extensive review of the theoretical considerations and the practical aspects involved in the manufacture of such articles along with a discussion of the crystallization mechanism attendent thereto. Reference is hereby made to that patent for further explanation of those factors.

Permanent magnets of the ferrite type now available commercially are manufactured through a multi-step, costly process of presintering, crushing, pressing, firing, and final grinding. Intricate shapes are difficult to make and, because of the hard and brittle nature of the material, the final grinding requires a great deal of skill and labor time which is, therefore, costly. Since glass-ceramic articles can be produced utilizing any of the conventional glass-forming methods, it can be appreciated that this invention surely simplifies the shaping process. Also, since crystallization of the glass occurs in situ, final grinding of the article would be minimal.

The facility of glass-forming methods would also be useful in the fabrication of intricately-shaped electronic devices which take advantage of the semiconducting properties of these glass-ceramics and in the production of fibers exhibiting magnetic and semiconducting behavior. The manufacture of thin fibers employing sintering techniques is extremely difficult, if not impossible.

Therefore, the principal object of this invention is to provide glass-ceramic articles demonstrating high magnetic susceptibility and low electrical resistivity.

Figure 2:
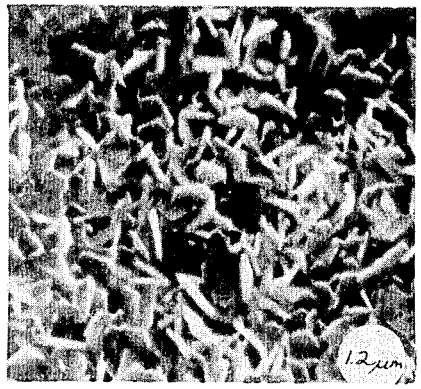
Figure 3:
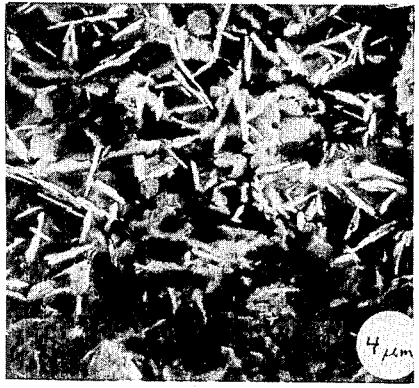
Figure 4:
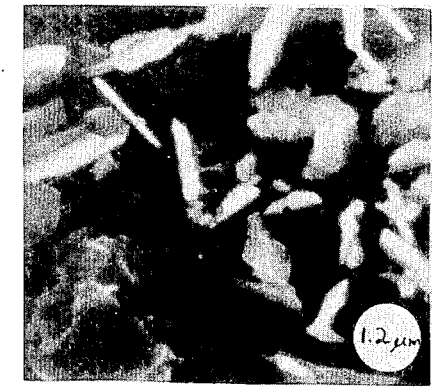

Other objects will become apparent from the following description of the invention and the appended illustrations wherein:

FIG. 1 represents the character of the magnetic properties exhibited by the articles produced in accordance with this invention; and FIGS. 2, 3, and 4 depict the crystal structure of the resultant glass-ceramic articles when produced according to two embodiments of the invention.

I have discovered that certain glasses in the

PbO—$Fe_2O_3$—$SiO_2$ composition field can be crystallized in situ to produce glass-ceramic articles exhibiting desirable electrical and magnetic properties. Hence, in its broadest aspects, my invention comprises melting a batch for a glass consisting essentially, in mole percent on the oxide basis, of about 15–45% of PbO, 8–25% $Fe_2O_3$, and 35–65% $SiO_2$, simultaneously cooling the melt at least below the transformation range thereof and shaping a glass article of a desired geometry therefrom, and thereafter heating the glass article at temperatures between about 500°–1100° C. for an adequate length of time to secure extensive fine-grained crystallization. (The transformation range is that temperature at which a liquid melt is considered to have been transformed into an amorphous solid; this temperature has commonly been delineated as lying between the annealing point and strain point of a glass.) The crystallization in situ of a glass article is a time-temperature dependent process. Therefore, it can be readily understood that at temperatures near the upper extreme of the heat treatment range only brief exposures will be required, e.g., ¼ hour or even less, whereas, in the cooler extreme of the heat treatment range much longer exposures will be required, perhaps 24 hours, in order to obtain the desired high degree of crystallinity. X-ray diffraction analyses have demonstrated the presence of PbO·$2Fe_2O_3$ and PbO·$6Fe_2O_3$ as the predominant crystal phases with a minor amount of $Fe_3O_4$ and a very minor amount of $Fe_2O_3$.

Although very satisfactory crystallized products can be secured by merely exposing the glass articles to temperatures within the above-defined crystallization range, I have found that finer-grained, more uniformly-sized crystals can be developed through a two-step heat treatment practice. Hence, my preferred heat treatment schedule contemplates initially heating the glass article to temperatures somewhat above the transformation range, e.g., between about 500°–650° C., and maintaining those temperatures for a sufficient length of time to provide good nucleation and incipient crystal growth. Thereafter, the so-nucleated article is heated between 650°–1100° C. for a sufficient period of time to insure extensive crystal growth. In this preferred schedule, I generally employ a nucleation period of about 1–6 hours followed by a crystallization growth step of about 1–8 hours.

I have learned, however, that subjecting the glass articles to excessively long crystallization treatments will cause some breakdown of the desired $PbO \cdot 6Fe_2O_3$ crystal phase such that additional $Fe_2O_3$ and melanotektite ($Pb_2Fe_2Si_2O_9$) may be precipitated out. This factor reduces the magnetic and semiconducting properties of the crystalline articles. Therefore, the optima of these two characteristics are achieved with treatment times of no more than 24 hours at the coolest extreme of the crystallization range and no more than ¼ hour at the hottest extreme in the range. However, it will be appreciated that the determination of the most favorable time at any particular temperature within the crystallization range is well within the technical ingenuity of a person of ordinary skill in the art. A study of the article through X-ray diffraction analysis and measurement of the magnetic properties will be of particular help in this regard.

Numerous modifications in the manufacturing process of these articles can be practiced. Hence, for example, when the melt is quenched to a temperature below the transformation range to shape it into a glass article, this glass shape may be cooled to room temperature to permit visual inspection of the glass quality thereof prior to commencing the crystallization heat treatment. Nevertheless, when speed in production and fuel economies are of first importance, the melt may merely be cooled to a glass article at some temperature immediately below the transformation range and the heat treatment initiated at once. In another embodiment of the manufacturing technique, no specific hold period at any particular temperature within the crystallization range is required. Thus, if the rate of heating the glass article above the transformation range is relatively slow and the final crystallization temperature near the upper extreme of the crystallization range, no dwell period per se at any one temperature will be necessary. Nevertheless, although the rate of growth of crystals is a function of time and temperature such that the development of crystals proceeds more rapidly as the temperature is raised, the rate at which the glass shape is heated above the transformation range must not be so rapid that there will be inadequate time for the growth of a sufficient number of crystals to provide internal support for the article and, consequently, the shape will deform and slump. Therefore, whereas heating rate of 10° C./minute and even higher have been employed successfully, particularly where formers or other physical supporting means have been supplied for the glass articles to minimize deformation thereof, I prefer to utilize heating rates of about 3°–5° C./minute. Such heating rates have produced shapes demonstrating very little, if any, distortion throughout the whole field of compositions suitable for this invention.

Table I records compositions, expressed in mole percent on the oxide basis, of thermally crystallizable glasses which, when subjected to the heat treatment practice of this invention, were crystallized in situ to relatively uniformly-sized, very fine-grained glass-ceramic articles. The ingredients comprising the glass batches may be any materials, either the oxides or other compounds, which, on being melted together, will be converted to the desired oxide compositions in the proper proportions. The batch ingredients were compounded, blended together for one hour to aid in securing a more homogeneous melt, and thereafter melted under oxidizing conditions in open fused silica crucibles for about 1½ hours at temperatures between 1350° and 1450° C. depending upon the composition. During the final half hour of melting, oxygen was bubbled through the melt at a rate of 1000 cc./minute to assure highly oxidizing conditions. The melts were thereafter poured into steel or carbon molds to yield squares about 2″ x 2″ x ¼″. The glass squares were subsequently transferred to an electrically-heated furnace and subjected to the crystallization schedules reported in Table II. At the conclusion of the heat treatment, the electric current to the furnace was cut off and the crystallized articles were either removed directly from the furnace into the ambient atmosphere or merely left in the furnace and allowed to cool to room temperature retained within the furnace. The rate at which the furnace cooled to room temperature was estimated to average about 3°–5° C./minute.

Although the above-recited proportions of PbO, $Fe_2O_3$, and $SiO_2$ are demanded to obtain a glass-ceramic article exhibiting good magnetic and semiconducting properties and containing $PbO \cdot 2Fe_2O_3$ and $PbO \cdot 6Fe_2O_3$ as the principal crystal phases with minor amounts of $Fe_3O_4$ and $Fe_2O_3$, small additions of compatible metal oxides totalling not more than about 10 mole percent may be incorporated to aid in melting the batch or to modify the chemical and physical properties of the crystalline articles. In particular, the presence of up to 5 mole percent $2TiO_2$ and/or $ZrO_2$ has been found to be especially useful in securing a more highly crystalline body having a greater proportion of ferrite crystals therein. It has been theorized that these compounds act as nucleating agents to provide sites for the growth of crystals thereof such that the crystallization process proceeds more efficiently. Additions of alkali metal oxides adversely affect the electrical properties of the articles and are preferably held to amounts less than about 5 mole percent. Additions of alkaline earth oxides appear to result in ferrites of those metals being formed such that the total thereof should, desirably, not exceed about 5 mole percent. The additions of $Al_2O_3$ seem to cause the development of aluminate crystal phases so, suitably, no more than about 5 mole percent ought to be included. $B_2O_3$ and $P_2O_5$ appear to behave as fluxes such that the total thereof is, preferably, held less than 5 mole percent.

The melts of the glasses reported in Table I were quite fluid and required no fining agent. However, in commercial scale melting practice, a conventional fining agent such as $As_2O_3$ may be added where needed.

TABLE I.—PERCENT

|  | 1 | 2 | 3 | 4 | 5 | 6 | 7 |
|---|---|---|---|---|---|---|---|
| PbO | 24.3 | 21.4 | 19.4 | 29.1 | 34.0 | 34.0 | 40.0 |
| $Fe_2O_3$ | 14.6 | 13.6 | 19.4 | 14.6 | 19.4 | 9.7 | 20.0 |
| $SiO_2$ | 58.2 | 62.1 | 58.3 | 53.4 | 43.7 | 53.4 | 40.0 |
| $ZrO_2$ | 2.9 | 2.9 | 2.9 | 2.9 | 2.9 | 2.9 |  |

Table II records the heat treatment schedule to which each glass body was exposed along with some measurements of the electrical resistivity and activation energy of such crystallized articles, and measurements of the magnetic hysteresis properties of the crystallized articles. In each schedule, the shapes were raised at the rate of about 5° C./minute to the reported hold temperatures. The crystallized articles had a black, dull metallic appearance and consisted of finely-dispersed crystals of $$PbO \cdot 6Fe_2O_3$$

and $PbO \cdot Fe_2O_3$ with, sometimes, minor amounts of $Fe_3O_4$ and very minor amounts of $\alpha Fe_2O_3$.

TABLE II

| Example No. | Heat treatment | Magnetic hysteresis properties | | | Electrical properties | |
|---|---|---|---|---|---|---|
| | | Remanence ($4\pi\pi_r$ gauss/g.) | Coercive force (oersteds) | Squareness ratio ($\mu_s/\mu_r$) | Resistivity at 25° C. (ohm-cm.) | Activation energy 500° C. (e.v.25°) |
| 1 | 700° C. for 22 hours | 51.2 | 351 | 0.431 | $10^{2.53}$ | 0.153 |
| 1 | 750° C. for 200 hours | 12.32 | 160 | 0.180 | $10^{2.75}$ | |
| 2 | 750° C. for 22 hours | 39.7 | 291 | 0.277 | $10^{2.75}$ | 0.166 |
| 3 | 700° C. for 21 hours | 33.4 | 174 | 0.144 | $10^{2.58}$ | 0.166 |
| 4 | 750° C. for 19 hours | 15.5 | 207 | 0.145 | $10^{2.81}$ | 0.123 |
| 5 | 700° C. for 20 hours | 30.7 | 238 | 0.204 | $10^{1.51}$ | 0.125 |
| 6 | 650° C. for 20 hours | 25.4 | 342 | 0.352 | $10^{2.03}$ | 0.158 |
| 7 | 750° C. for 15 hours | | | | $10^{3}$ | |

Tables I and II clearly illustrate the composition and process parameters for producing glass-ceramic articles demonstrating good magnetic and semiconducting properties. As a matter of fact, the electrical resistivities and activation energies measured on the articles of this invention are believed to be the lowest ever determined on glass-ceramic articles. However, the hazard of excessive heat treatment is unmistakenly evidenced in the heat treatments recorded in Table II for Example 1. Thus, the quality of the magnetic and semiconducting properties of the articles decreases when very long crystallization periods are utilized. The optimum magnetic and semiconducting properties have been developed in glasses consisting essentially of 15–45 mole percent PbO, 35–65 mole percent $SiO_2$, and 8–25 mole percent $Fe_2O_3$ with about 2–4 mole percent $ZrO_2$.

The crystal content of these glass-ceramic articles exceeds 50% by weight and is commonly in excess of 75% by weight, depending upon the extent to which the batch components are adaptable to the formation of crystal phases and the optional presence of $TiO_2$ and/or $ZrO_2$. The crystals, themselves, are relatively uniformly fine-grained, substantially all being smaller than 10 microns in diameter and most being smaller than 3 microns in diameter.

Example 1 is my preferred composition which, when subjected to the first crystallization schedule reported in Table II, provides a glass-ceramic article which is very highly crystalline and manifests excellent magnetic and semiconducting properties.

It is now known that all ferrimagnetic materials are composed of many small magnets or "domains," each of which consists of many atoms. Within a domain all of the atoms are aligned in parallel and the domain is thus saturated, even when no field is applied. The material is, hence, stated to be "spontaneously magnetized." When the magnetization of the material is altered, the atoms turn together in groups (each atomic magnet around its own axis), the atoms in each group remaining parallel to each other so that they are more nearly aligned with any magnectic field applied to the material. The exact size and configuration of a single domain varies with the individual material; the single domain size of lead ferrite is on the order of one micron. Therefore, it can be readily appreciated that the most advantageous magnetic properties will be observed in articles wherein the crystal size of the lead ferrite approximates one micron.

The appended drawing, FIG. 1, illustrates the character of the magnetic properties of Example 2 with respcet to the size of the crystals therein as measured utilizing an electron microscope. Thus, the critical angle domain size is designated as the point at which the curves flatten out. Hence, the flattened portion of the curves indicates that the article exhibits ferrimagnetic properties. Below this crystal size, the article demonstrated superparamagnetic behavior. Therefore, by controlling the crystal size, an article can be made to manifest different magnetic properties.

The crystallization in situ of a glass article to a glass-ceramic article is a time-temperature controlled process wherein the rate and size of the crystal growth can be closely regulated by carefully monitoring the heat treatment applied to the glass article. FIG. 1 (representing Example 2 heat treated at 750° C.) demonstrates that the magnetic properties of Example 2 become essentially constant at crystal sizes about $1 \times 10^3$–$1.2 \times 10^3$ A. (1–1.2 microns). Therefore, through reasonably careful control of the heat treatment applied to the original glass article to convert it to a glass-ceramic body, the size of the crystals developed can be readily controlled to produce an article having very uniformly-sized crystals yielding the optimum magnetic properties. Thus, the manufacture of glass-ceramic articles removes the necessity for the extensive ball-milling or attrition melting utilized in the production of sintered articles to secure particles in the range of one micron, these particles being less than uniform in size than those which can be grown in a glass-ceramic body.

It has been shown that the domains of lead ferrite are strongly magnetically anisotropic, i.e., they are magnetized more easily (and their residual inductance and coercivity are better) if they are aligned in a certain preferred crystallographic direction with respect to the magnetizing field. The crystal structure of lead ferrite is hexagonal with the preferred crystallization direction being along the c-axis (i.e., [001] direction. Hence, peculiarly, the preferred direction of magnetization of the lead ferrite crystals is perpendicular to the two parallel surfaces, i.e., the domain plates are more easily magnetized if the magnetic lines of force of the applied external field are normal to the plate. It is apparent, then, that the characteristics of a lead-ferrite magnet will be improved where the domains have been properly aligned.

I have discovered that the lead ferrite particles can be aligned during the crystallization in situ, if the heat treatment is carried out in a magnetic field. In view of the frictional stresses and the general immobility of the domains dispersed in the glassy matrix, this magnetic alignment can be most advantageously carried out at temperatures between about 800°–1100° C. where the viscosity of the glassy matrix is relatively low. However, that such alignment can be accomplished even at relatively low temperatures is clearly manifested by a comparison of FIG. 2 with FIGS. 3 and 4. Thus, FIG. 2 is an electron micrograph demonstrating the crystal structure of Example 2 which had been crystallized at 750° C. for 20 hours. FIG. 3 is an electron micrograph illustrating the crystal structure of Example 4 which had been crystallized at 750° C. for 20 hours in an applied magnetic field of 10,000 gausses. FIG. 4 is an enlargement of the area marked in FIG. 3 to better depict the crystal orientation. The small white circle on each of FIGS. 2, 3, and 4 represents 1.2 microns, 4 microns, and 1.2 microns, respectively.

FIG. 2 demonstrates the completely random dispersion which the crystals assume in the glassy matrix during the crystallization step when such is undertaken in the conventional manner. This structure is in marked contrast to the preferential stacking of the hexagonal plates of the lead ferrite along the c-axis brought about through the application of a magnetic field during the crystallizing process, as is illustrated in FIG. 3 and, particularly, in FIG. 4.

I claim:
1. A thermally crystallizable glass consisting essentially, in mole percent on the oxide basis, of about 15–45% PbO, 8–25% $Fe_2O_3$, and 35–65% $SiO_2$.

2. A glass-ceramic ferrite article comprising fine-grained crystals consisting predominantly of $PbO \cdot 2Fe_2O_3$, $PbO \cdot 6Fe_2O_3$, and $Fe_3O_4$ substantially uniformly dispersed in a glassy matrix and constituting the major proportion of the article, said crystals being formed through crystallization in situ from a glass article consisting essentially, in mole percent on the oxide basis, of about 15–45% PbO, 8–25% $Fe_2O_3$, and 35–65% $SiO_2$.

3. A glass-ceramic ferrite article according to claim 2 wherein said glass article consists essentially, in mole percent on the oxide basis, of 20–30% PbO, 10–20% $Fe_2O_3$, 40–60% $SiO_2$, and 2–4% $ZrO_2$.

4. A glass-ceramic ferrite article according to claim 2 wherein said lead ferrite crystals are preferentially aligned along the c-axis.

5. A method for making a glass-ceramic ferrite article comprising fine-grained crystals consisting predominantly of $PbO \cdot 2Fe_2O_3$, $PbO \cdot 6Fe_2O_3$, and $Fe_3O_4$ substantially uniformly dispersed in a glassy matrix and constituting the major proportion of the article with comprises:
   (1) melting a batch for a glass consisting essentially, by weight on the oxide basis, of about 15–45% PbO, 8–25% $Fe_2O_3$, and 35–65% $SiO_2$;
   (2) simultaneously cooling the melt at least below the transformation range thereof and shaping a glass article therefrom; and, subsequently,
   (3) heating said glass article to a temperature between about 500°–1100° C. for a sufficient period of time to attain the desired crystallization in situ.

6. A method for making a glass-ceramic ferrite article according to claim 5 wherein said glass consists essentially, in mole percent on the oxide basis, of 20–30% PbO, 10–20% $Fe_2O_3$, 40–60% $SiO_2$ and 2–4% $ZrO_2$.

7. A method for making a glass-ceramic ferrite article according to claim 5 wherein the period of time to attain the desired crystallization ranges between about ¼–24 hours.

8. A method for making a glass-ceramic ferrite article according to claim 5 wherein said glass article is heated to about 600°–700° C. for about 1–6 hours and thereafter heated to about 700°–1100° C. for about 1–8 hours.

9. A method for making a glass-ceramic ferrite article according to claim 5 wherein said glass article is heated between about 500°–1100° C. in a magnetic field for a sufficient period of time to attain the desired crystallization in situ and to preferentially align said lead ferrite crystals along the c-axis.

References Cited
UNITED STATES PATENTS

| | | | |
|---|---|---|---|
| 2,927,898 | 3/1960 | Pawlek | 252—62.59 |
| 2,968,622 | 1/1961 | Whitehurst | 65—33 X |
| 3,282,711 | 11/1966 | Lin | 65—33 X |
| 3,380,920 | 4/1968 | Cochardt | 252—62.63 |

ARTHUR D. KELLOGG, Primary Examiner

U.S. Cl. X.R.

65—33; 252—62.63